United States Patent
Kikuchi (10) Patent No.: US 10,628,716 B2
(45) Date of Patent: Apr. 21, 2020

(54) IMAGE FORMING APPARATUS THAT DETERMINES A JOB GENERATION METHOD BASED ON IMAGE PROCESSING TIME

(71) Applicant: KYOCERA Document Solutions Inc., Osaka (JP)

(72) Inventor: Ryota Kikuchi, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/405,248

(22) Filed: May 7, 2019

(65) Prior Publication Data
US 2019/0347054 A1    Nov. 14, 2019

(30) Foreign Application Priority Data
May 10, 2018  (JP) .................................. 2018-091330

(51) Int. Cl.
  *G06F 3/12*  (2006.01)
  *G06K 15/02*  (2006.01)

(52) U.S. Cl.
  CPC ....... *G06K 15/1823* (2013.01); *G06F 3/1204* (2013.01); *G06F 3/1205* (2013.01); *G06F 3/126* (2013.01); *G06F 3/1215* (2013.01); *G06F 3/1254* (2013.01); *G06K 15/1861* (2013.01)

(58) Field of Classification Search
  CPC .................................................. G06K 15/1823
  See application file for complete search history.

(56) References Cited

U.S. PATENT DOCUMENTS

| | | | |
|---|---|---|---|
| 6,034,783 A * | 3/2000 | Honma | H04N 1/32358 358/1.12 |
| 9,594,530 B2 | 3/2017 | Uemura | |
| 2006/0023243 A1* | 2/2006 | Asai | H04N 1/00435 358/1.13 |

(Continued)

FOREIGN PATENT DOCUMENTS

JP       2016163987 A       9/2016

OTHER PUBLICATIONS

The extended European search report issued by the European Patent Office dated Oct. 9, 2019, which corresponds to European Patent Application No. 19173260.1-1221 and is related to U.S. Appl. No. 16/405,248.

*Primary Examiner* — Beniyam Menberu
(74) *Attorney, Agent, or Firm* — Studebaker & Brackett PC (57) ABSTRACT

An image forming apparatus includes a controller. The controller generates page images of one or more pages by performing image processing on acquired input image data. The controller determines a job generation method to be either a first method or a second method. The job generation method is a method through which print job data is generated. The first method is a method through which the print job data is generated based on page image data indicating a page image of one page among the one or more pages upon completing the image processing on the page image of the one page. The second method is a method through which the print job data is generated based on the page image data of all pages included in the output image after completing the image processing on the page images of all the pages included in the output image.

3 Claims, 9 Drawing Sheets

(56) References Cited

U.S. PATENT DOCUMENTS

| | | | |
|---|---|---|---|
| 2011/0255117 A1* | 10/2011 | Umeda | G06K 15/1807 358/1.13 |
| 2013/0088736 A1* | 4/2013 | Kaneda | G06K 15/1817 358/1.13 |
| 2015/0356385 A1* | 12/2015 | Naka | G06K 15/1807 358/1.15 |
| 2016/0253131 A1 | 9/2016 | Uemura | |

* cited by examiner

IMAGE FORMING APPARATUS THAT DETERMINES A JOB GENERATION METHOD BASED ON IMAGE PROCESSING TIME

INCORPORATION BY REFERENCE

The present application claims priority under 35 U.S.C. § 119 to Japanese Patent Application No. 2018-091330, filed on May 10, 2018. The contents of this application are incorporated herein by reference in their entirety.

BACKGROUND

The present disclosure relates to an image forming apparatus.

An image forming apparatus which calculates an estimated completion time of a job and notifies of the estimated completion time of the job has been disclosed. In detail, the image forming apparatus includes a job management section and a controller. The job management section receives and spools each job received from a computer. When the job management section receives a new job, the controller calculates the estimated completion time in which the new job will be completed. The estimated completion time is calculated based on printing speed of the image forming apparatus, a number of printing sheets needed to perform the new job, and an estimated completion time of the job that is currently spooled and on standby. The controller notifies of the calculated estimated completion time.

SUMMARY

An image forming apparatus according to an aspect of the present disclosure includes a controller and an image forming section. The controller acquires input image data. The image forming section forms an image on a sheet based on the input image data. The controller generates output image data by performing image processing on the input image data. The controller generates print job data based on the output image data. The controller performs a print job based on the print job data. The controller determines a job generation method to be either a first method or a second method. The job generation method is a method through which the print job data is generated. An output image indicated by the output image data includes page images of one or more pages. Each page image is an image to be formed on one sheet. The first method is a method through which the print job data is generated based on page image data indicating a page image of one page among the one or more pages upon completing the image processing on the page image of the one page. The second method is a method through which the controller generates the print job data based on page image data of all pages included in the output image after completing the image processing on page image of all the pages included in the output image. The controller determines the job generation method based on image processing time necessary for the image processing, printing time necessary to perform the print job, and a page count of the page images included in the output image.

DETAILED DESCRIPTION

The following describes embodiments of the present disclosure with reference to the accompanying drawings. However, the present disclosure is not limited to the following embodiments. Elements that are the same or equivalent are labelled with the same reference signs in the drawings and description thereof is not repeated.

First Embodiment

Figure 1:
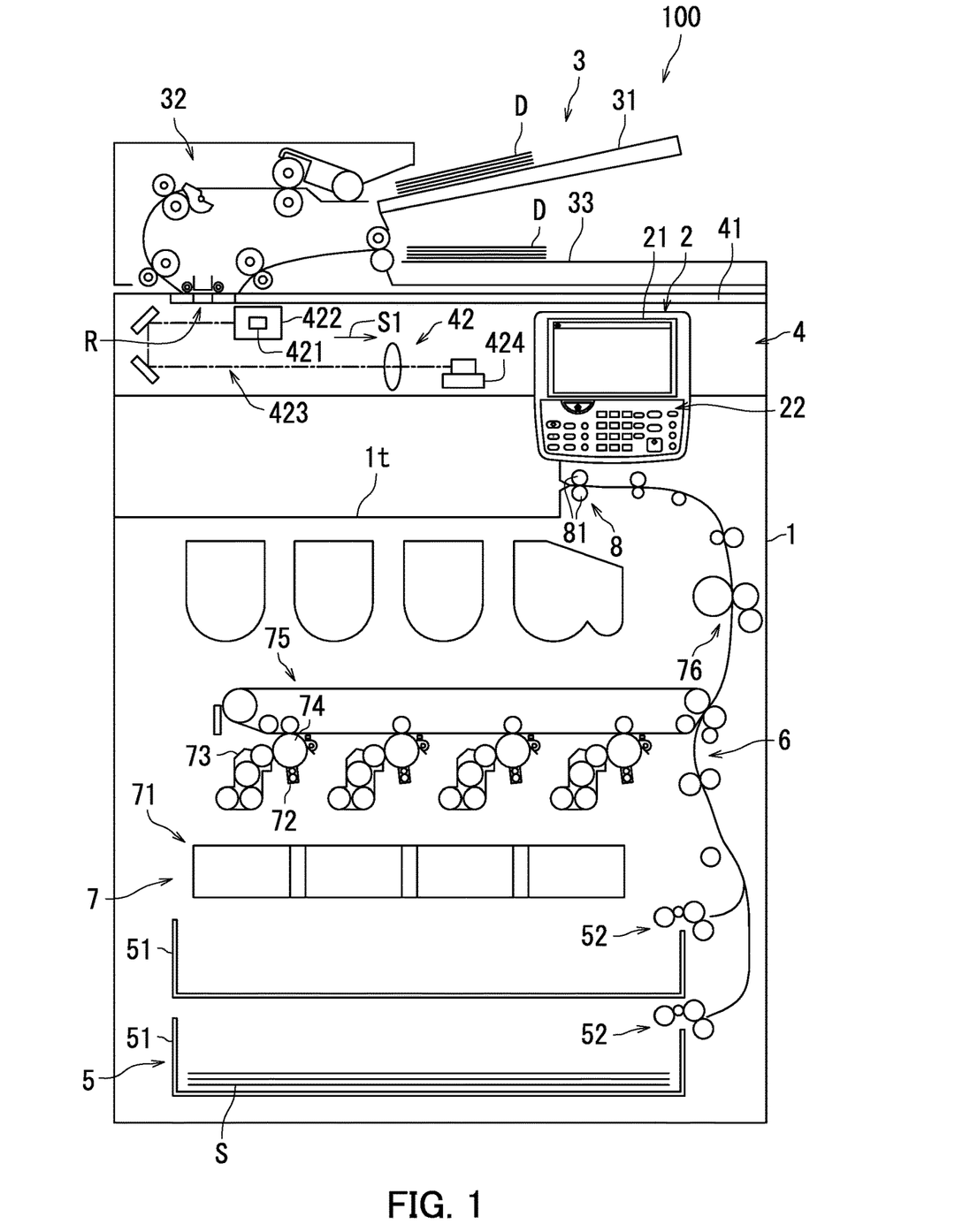
FIG. 1 is a diagram illustrating a configuration of an image forming apparatus according to a first embodiment of the present disclosure.

The following first describes a configuration of an image forming apparatus 100 according to a first embodiment with reference to FIG. 1. FIG. 1 is a diagram illustrating the configuration of the image forming apparatus 100 according to the first embodiment. According to the present embodiment, the image forming apparatus 100 is a multifunction peripheral.

As illustrated in FIG. 1, the image forming apparatus 100 includes a casing 1, an operation section 2, a document conveyor device 3, a document reading device 4, a sheet feeding section 5, a sheet conveyor device 6, an image forming section 7, an ejection section 8, and an exit tray 1t. The operation section 2 is an example of a reception section.

The operation section 2 receives instruction from a user for the image forming apparatus 100. The operation section 2 outputs a signal indicating the instruction from the user upon receiving the instruction from the user. The operation section 2 is an example of the reception section.

The operation section 2 includes a touch display 21 and a plurality of hard keys 22. The touch display 21 includes a display and a touch sensor. Examples of the display include a liquid-crystal display or an organic electroluminescent (EL) display. The touch sensor detects touch by a detected object. The touch sensor is a resistive film method touch sensor or an electrostatic capacitance method touch sensor, for example. The hard keys 22 include a numeric keypad, a start key, and a cancel key, for example.

According to the present embodiment, the user instructs a performance request for the printing process to the image forming apparatus 100 by operating the operation section 2. The user also specifies printing process conditions when instructing a performance request for the printing process. The printing process conditions are conditions related to the printing process and include for example printing sheet size and printing quantity.

The operation section 2 outputs a signal indicating a performance request for the printing process upon receiving a performance request for the printing process. The operation section 2 also outputs a signal indicating the printing process conditions upon receiving an instruction of the printing process conditions.

The document conveyor device 3 executes a document conveyance process.

In detail, document conveyor device 3 includes a document loading tray 31, a document conveyance section 32, and a document exit tray 33. A document D of at least one sheet is loaded on the document loading tray 31. The document conveyance section 32 conveys the document D loaded on the document loading tray 31 to the document exit tray 33 a sheet at a time. The document D is conveyed through a reading position R. The reading position R is a position in which the document reading device 4 can read an image of the document D.

The document reading device 4 performs a document reading process. In detail, the document reading device 4 includes contact glass 41 and a reading mechanism 42. A sheet of the document D is loaded onto the contact glass 41. The reading mechanism 42 reads the image of the document D loaded on the contact glass 41 or passing the reading position R and outputs a signal indicating the image of the document D. In the following, the image of the document D is referred to as a "document image". The document reading device 4 is a scanner, for example.

The sheet feeding section 5 performs a feeding process. According to the present embodiment, the sheet feeding section 5 includes two sheet feeding cassettes 51 and two sheet feeding roller groups 52. Each sheet feeding cassette 51 houses a plurality of sheets S. Each sheet S is paper, for example. The two sheet feeding roller groups 52 are respectively located at the two sheet feeding cassettes 51. Each sheet feeding roller group 52 feeds the sheets S housed in a corresponding one of the sheet feeding cassettes 51 a sheet at a time. The sheets S are fed at constant intervals. The sheet conveyor device 6 conveys a fed sheet S to the ejection section 8.

The sheet conveyor device 6 executes a sheet conveyance process. In detail, the sheet conveyor device 6 includes rollers and guide members. The sheet conveyor device 6 conveys the sheet S from the sheet feeding section 5 to the ejection section 8. The sheet S is conveyed through the image forming section 7.

The image forming section 7 performs an image forming process. In detail, the image forming section 7 forms an image on the sheet S. According to the present embodiment, the image forming section 7 includes an exposure device 71, a charger 72, a development device 73, a photosensitive drum 74, a transfer device 75, and a fixing device 76, and forms an image electrographically. The exposure device 71 forms an electrostatic latent image on a surface of the photosensitive drum 74 by exposing the photosensitive drum 74 to light. The charger 72 uniformly charges the photosensitive drum 74 to a prescribed potential. The development device 73 supplies toner to the photosensitive drum 74 and develops the electrostatic latent image formed on the photosensitive drum 74. The transfer device 75 transfers a resulting toner image formed on the photosensitive drum 74 to the sheet S, and the fixing device 76 fixes the toner image to the sheet S.

The ejection section 8 ejects the sheet S to the exit tray 1*t* by performing a sheet ejection process. In detail, the ejection section 8 includes an ejection roller pair 81. The ejection roller pair 81 ejects the sheet S conveyed from the image forming section 7 by the sheet conveyor device 6 to the exit tray 1*t*. The exit tray 1*t* is provided outside of the casing 1.

Figure 2:
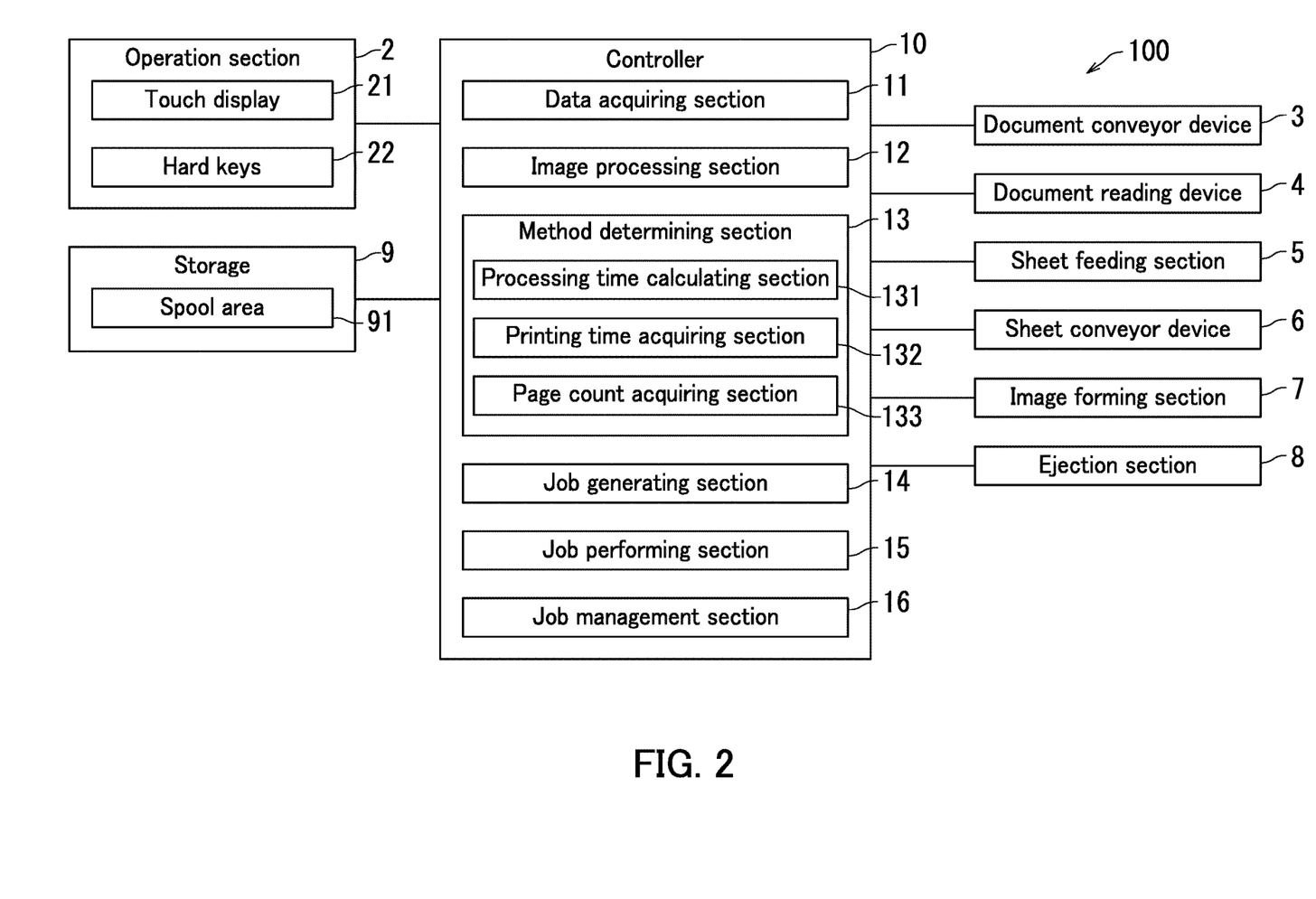
FIG. 2 is a block diagram illustrating the configuration of the image forming apparatus according to the first embodiment of the present disclosure.

The following further describes the configuration of the image forming apparatus 100 according to the first embodiment with reference to FIGS. 1 and 2. FIG. 2 is a block diagram illustrating the configuration of the image forming apparatus 100 according to the first embodiment.

As illustrated in FIG. 2, the image forming apparatus 100 further includes storage 9 and a controller 10.

The storage 9 stores various data therein. The storage 9 has a spool area 91. The storage 9 includes a storage device and semiconductor memory. The storage device includes for example either or both a hard disk drive (HDD) and a solid-state drive (SSD). The storage 9 includes semiconductor memory. The semiconductor memory includes for example random-access memory (RAM) and read-only memory (ROM).

According to the present embodiment, the storage 9 stores data indicating capability of the image forming apparatus 100. The data indicating the capability of the image forming apparatus 100 is for example data indicating printing speed. The printing speed is for example 45 sheets per minute.

The controller 10 controls operation of each section of the image forming apparatus 100. The controller 10 includes a processor such as a central processing unit (CPU). The controller 10 also includes integrated circuits used for the image forming process. The integrated circuits used for the image forming process include for example an application-specific integrated circuit (ASIC).

The controller 10 functions as a data acquiring section 11, an image processing section 12, a method determining section 13, a job generating section 14, a job performing section 15, and a job management section 16 by executing a program stored in the storage 9.

The data acquiring section 11 acquires input data. The input data includes input image data. The data acquiring section 11 acquires the input image data by receiving a signal indicating the document image from the document reading device 4. According to the present embodiment, the input data also includes data indicating the printing process conditions. The data acquiring section 11 acquires the data indicating the printing process conditions based on a signal indicating the printing process conditions and output by the operation section 2.

The image processing section 12 performs image processing based on the input data. In detail, the image processing section 12 performs image processing on the input image data according to the printing conditions. The image processing is for example rasterization processing.

The image processing section 12 generates output image data indicating an output image by performing the image processing on the input image data. The output image includes at least one page image. The page image is an image to be formed on a sheet S of one page. In other words, the page image is an image of the sheets S on a page-by-page basis. According to the present embodiment, the image processing section 12 generates page image data for at least one page.

The method determining section 13 determines a job generation method to be either a first method or a second method by performing a method determination process. The job generation method is a method through which the job generating section 14 generates data indicating a print job. In the following, the data indicating a print job is referred to as "print job data".

The method determining section 13 includes a processing time calculating section 131, a printing time acquiring section 132, and a page count acquiring section 133.

The processing time calculating section 131 calculates image processing time. The image processing time is time necessary for image processing by the image processing section 12. According to the present embodiment, the image processing time starts when the image processing on the input image data starts, and ends when generation of the page image for a first page is completed. The processing time calculating section 131 stores data indicating the calculated image processing time in the storage 9.

The printing time acquiring section 132 acquires printing time. The printing time is time necessary to perform a print job corresponding to a page image of one page. Specifically, the printing time is time necessary to perform a print job on one sheet S. The printing time is for example time in which one sheet S is fed, an image is formed on one side of the sheet S, and the sheet S is ejected to the exit tray 1t. According to the present embodiment, the printing time is calculated based on data indicating the printing speed stored in the storage 9. The printing time is for example 1.34 seconds.

The page count acquiring section 133 acquires a page count of page images included in the output image. The page count acquiring section 133 acquires for example the page count of the page images based on a size (capacity) of a storage area in which the output image data is stored.

The method determining section 13 determines the job generation method to be either the first method or the second method based on the image processing time, the printing time, and the number of pages. According to the present embodiment, the method determining section 13 determines the job generation method by determining whether or not the number of pages is equal to or less than a page threshold. The method determining section 13 determines the job generation method by determining whether or not the image processing time is less than the printing time.

The job generating section 14 generates print job data based on a performance request for the printing process. The job generating section 14 generates print job data based on the output image data. In other words, the job generating section 14 generates print job data based on data indicating a page image. In the following, data indicating a page image may be referred to as "page image data". The job generating section 14 generates the print job data through the job generation method determined by the method determining section 13.

When the first method is determined to be the job generation method, the job generating section 14 generates print job data each time a page image of one page is generated by the image processing section 12. That is, the first method is a method through which print job data is generated based on the page image data of one page upon completion of the image processing on the page image of the one page. By contrast, when the second method is determined to be the job generation method, the job generating section 14 generates print job data after page images of all pages are generated by the image processing section 12. That is, the second method is a method through which print job data is generated based on the page image data of all pages included in the output image after completion of the image processing on the page images of all pages included in the output image.

The job performing section 15 performs the print job based on the print job data generated by the job generating section 14. As a result, the feeding process by the sheet feeding section 5, the sheet conveyance process by the sheet conveyor device 6, the image forming process by the image forming section 7, and the ejection process by the ejection section 8 are performed.

The job management section 16 manages the performance of a print job through the job performing section 15. In detail, the job management section 16 manages a print job being performed by the job performing section 15. The job management section 16 also manages a print job scheduled to be performed by the job performing section 15.

Figure 3:
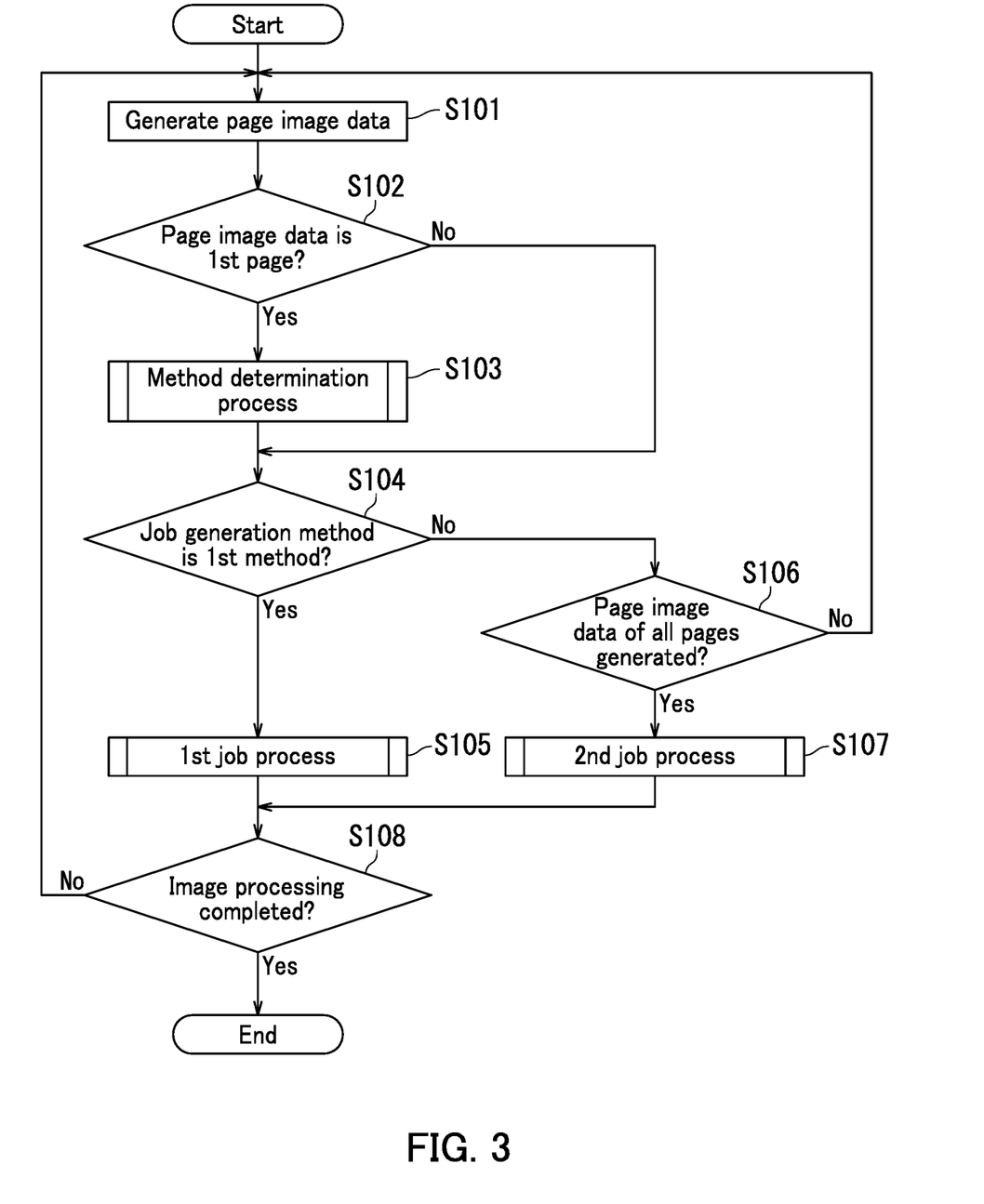
FIG. 3 is a flowchart depicting a printing process according to the first embodiment of the present disclosure.

The following describes the printing process according to the first embodiment with reference to FIG. 3. FIG. 3 is a flowchart depicting the printing process according to the first embodiment. The printing process is started upon the operation section 2 receiving a performance request for the printing process and the data acquiring section 11 acquiring the input data.

As depicted in FIG. 3, the image processing section 12 generates page image data of one page by performing the image processing upon the data acquiring section 11 acquiring the input data (Step S101). Next, the controller 10 determines whether or not the generated page image data indicates a page image of a first page (Step S102). When the controller 10 determines that the generated page image data does not indicate the page image of the first page (Step S102: No), the printing process advances to Step S104.

When determining that the generated page image data does indicate the page image of the first page by contrast (Step S102: Yes), the controller 10 performs the method determination process (Step S103). In the method determination process, the method determining section 13 determines the job generation method to be either the first method or the second method. The controller 10 stores data indicating the determined job generation method in the storage 9.

Next, the controller 10 determines whether or not the determined job generation method is the first method (Step S104). Upon determining that the job generation method is the first method (Step S104: Yes), the controller 10 performs a first job process (Step S105). The first job process is a process performed by the job generating section 14 and the job performing section 15 when the first method is determined to be the job generation method.

Upon determining that the job generation method is not the first method by contrast, or that the job generation method is the second method (Step S104: No), the controller 10 determines whether or not the page image data for all pages has been generated (Step S106). The controller 10 determines whether or not the page image data for all pages has been generated by for example determining whether or not the image processing on the input image data is completed. Upon determining that the page image data of all pages has been generated (Step S106: Yes), the controller 10 performs a second job process (Step S107). The second job process is a process performed by the job generating section 14 and the job performing section 15 when the second method is determined to be the job generation method.

When the controller 10 determines that not all page images have been generated by contrast (Step S106: No), the printing process returns to Step S101.

When the first job process is performed (Step S105) or the second job process is performed (Step S107), the controller 10 determines whether or not the image processing section 12 has completed the image processing (Step S108). When the controller 10 determines that the image processing section 12 has not completed the image processing (Step S108: No), the printing process returns to Step S101. When the controller 10 determines that the image processing section 12 has completed image processing by contrast (Step S108: Yes), the printing process ends.

Figure 4:
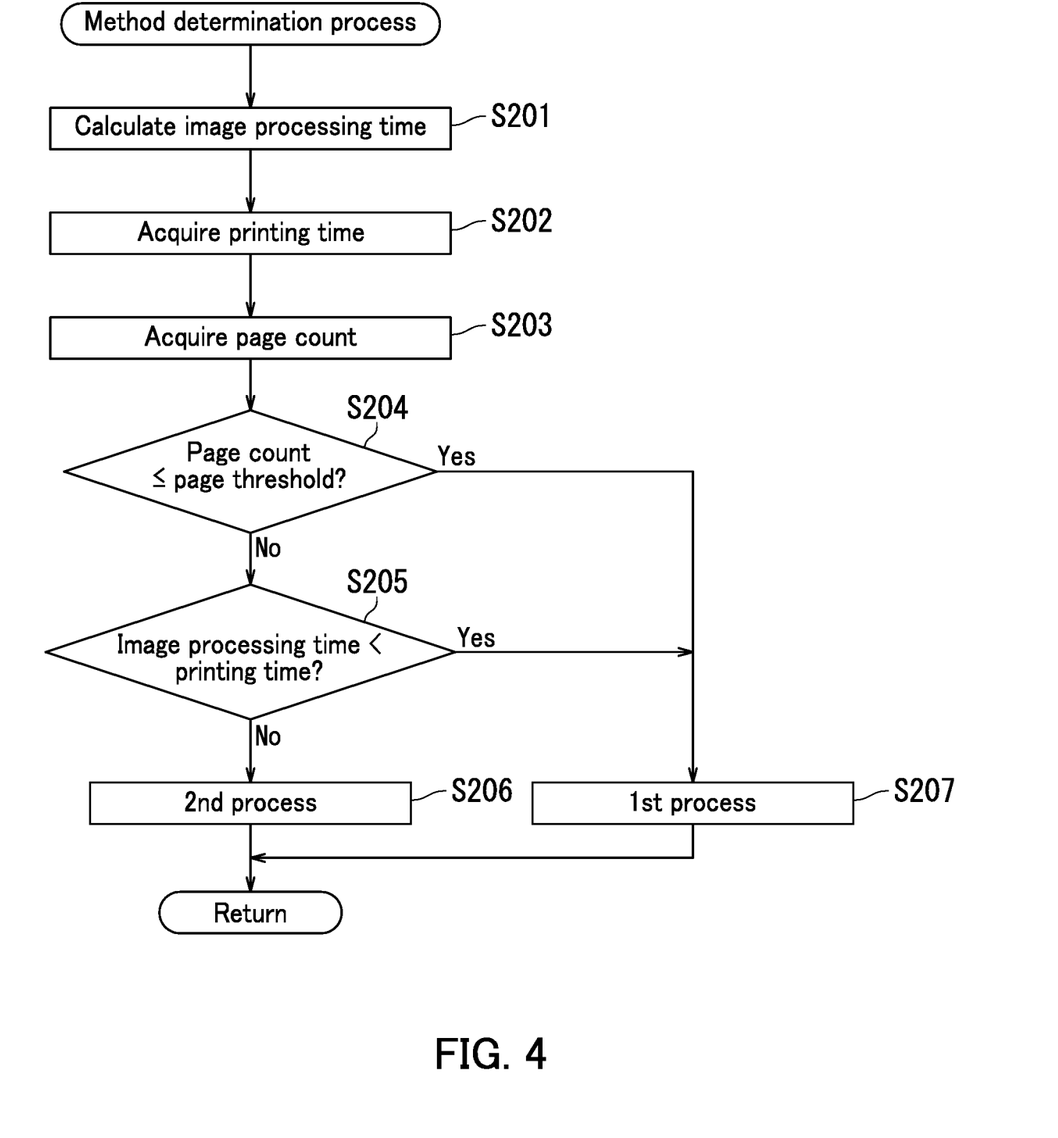
FIG. 4 is a flowchart depicting a method determination process according to the first embodiment of the present disclosure.

The following describes the method determination process (Step S103 in FIG. 3) according to the first embodiment with reference to FIG. 4. FIG. 4 is a flowchart depicting the method determination process according to the first embodiment. According to the present embodiment, the method determination process is started when the image processing section 12 generates the page image data of the first page (Step S102 in FIG. 3: Yes).

As depicted in FIG. 4, the processing time calculating section 131 calculates the image processing time (Step S201). Next, the printing time acquiring section 132 acquires the printing time (Step S202). Next, the page count acquiring section 133 acquires the page count (Step S203). Next, the method determining section 13 determines whether or not the page count is equal to or less than the page threshold (Step S204). The data indicating the page threshold is for example set by an administrator of the image forming apparatus 100 and prestored in the storage 9. The page threshold is "1", for example.

Upon determining that the page count is greater than the page threshold (Step S204: No), the method determining section 13 determines whether or not the image processing time is less than the printing time (Step S205). Upon determining that the image processing time is not less than the printing time (Step S205: No), the method determining section 13 determines the job generation method to be the second method (Step S206), and the method determination process ends. Upon determining that the page count is equal to or less than the page threshold (Step S204: Yes) or the image processing time is less than the printing time (Step S205: Yes) by contrast, the method determining section 13 determines the job generation method to be the first method (Step S207), and the method determination process ends.

Note that the order of the method determination process is not limited to the above order. For example, Steps S201 to S203 may be shifted in order. Also, Steps S204 and S205 may be replaced with each other.

Figure 5:
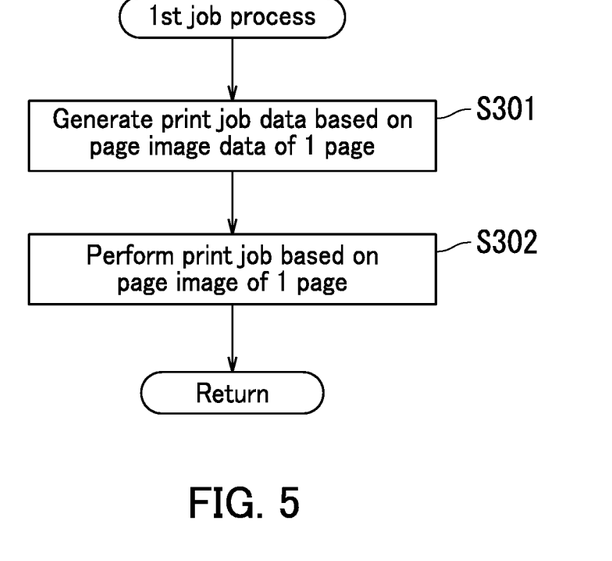
FIG. 5 is a flowchart depicting a first job process according to the first embodiment of the present disclosure.
Figure 6:
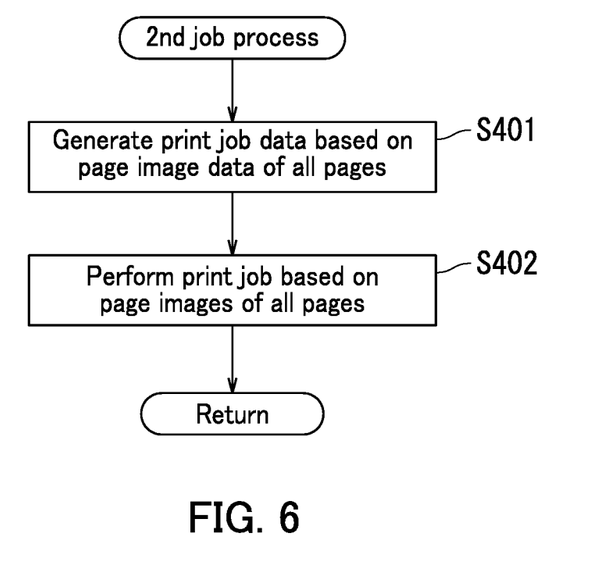
FIG. 6 is a flowchart depicting a second job process according to the first embodiment of the present disclosure.

The following describes the first job process and the second job process according to the first embodiment with reference to FIGS. 5 to 8C. FIG. 5 is a flowchart depicting the first job process according to the first embodiment. FIG. 6 is a flowchart depicting the second job process according to the first embodiment.

In the first job process as depicted in FIG. 5, the job generating section 14 generates print job data based on the page image data of one page upon the page image of the one page being generated (Step S301). Next, the job performing section 15 performs a print job based on the print job data generated based on the page image data of the one page (Step S302), and the first job process ends. Through the above, the image forming process is performed for the page image of one page.

In the second job process as depicted in FIG. 6 by contrast, the job generating section 14 generates print job data based on the page image data of all pages upon the page images of all pages being generated (Step S401). Next, the job performing section 15 performs a print job based on the print job data generated based on the page image data of all pages (Step S402), and the second job process ends. Through the above, the image forming process for the page images of all pages is performed en bloc.

Figure 7A:
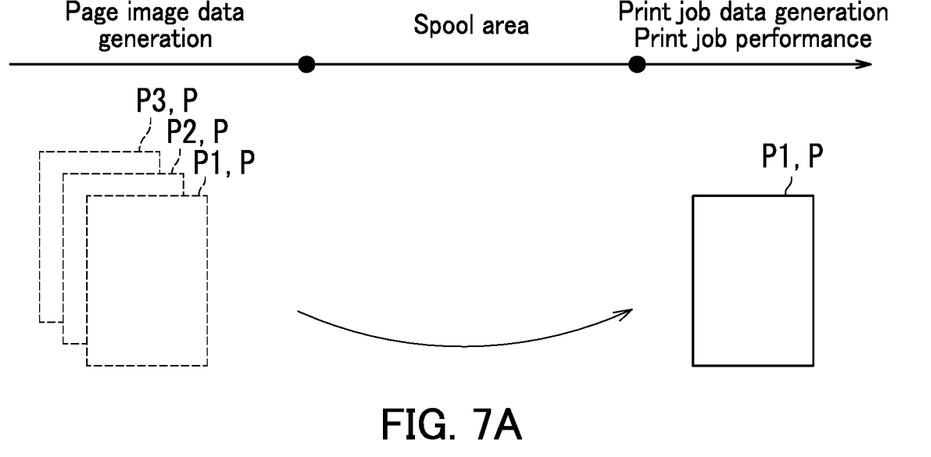
FIG. 7A is a diagram for describing the first job process according to the first embodiment of the present disclosure.
Figure 7B:
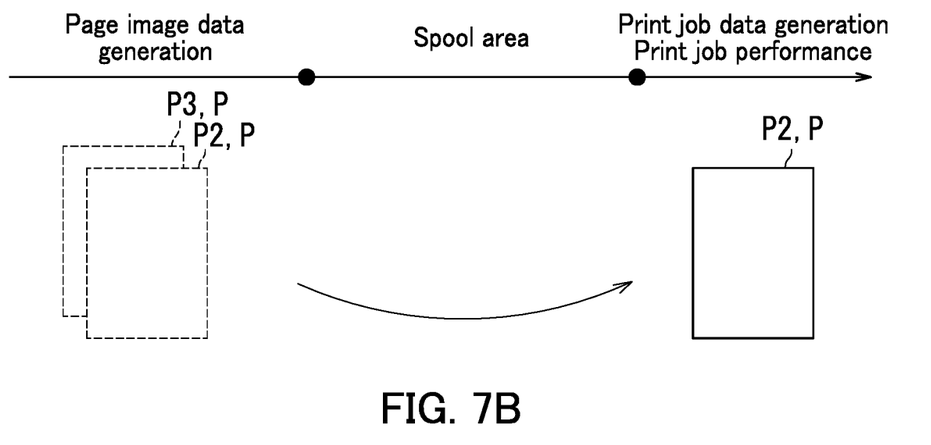
FIG. 7B is a diagram for describing the first job process according to the first embodiment of the present disclosure.
Figure 7C:
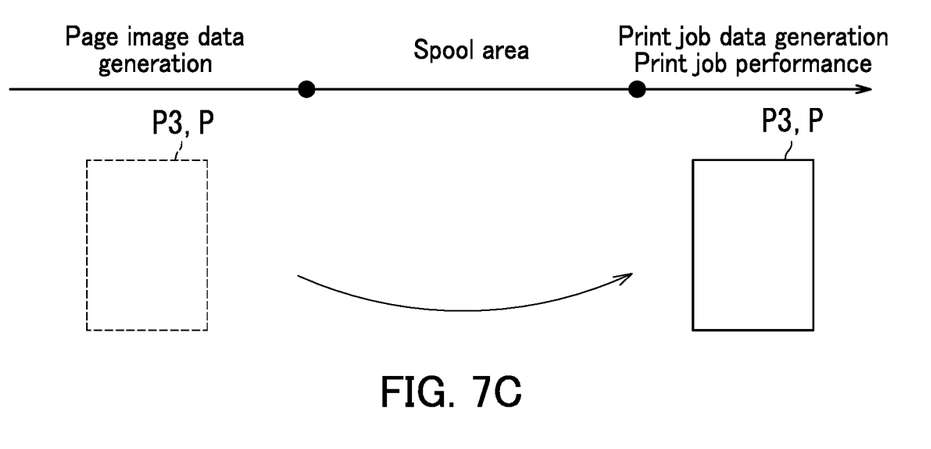
FIG. 7C is a diagram for describing the first job process according to the first embodiment of the present disclosure.
Figure 8A:
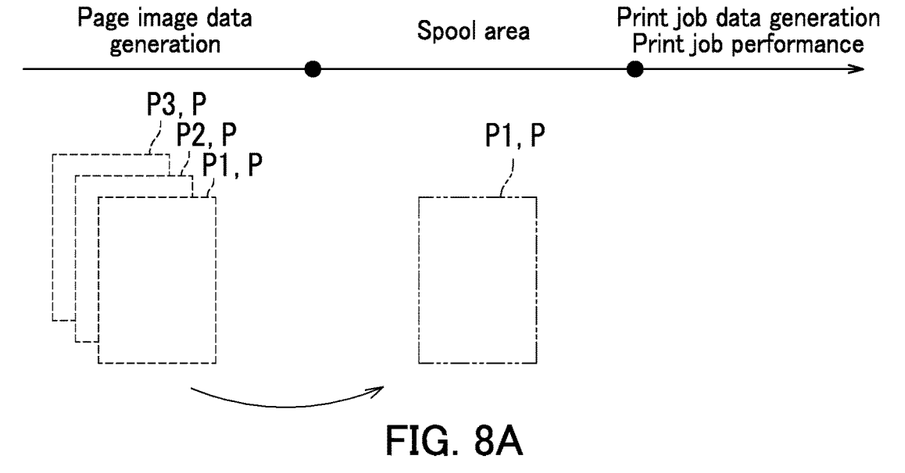
FIG. 8A is a diagram for describing the second job process according to the first embodiment of the present disclosure.
Figure 8B:
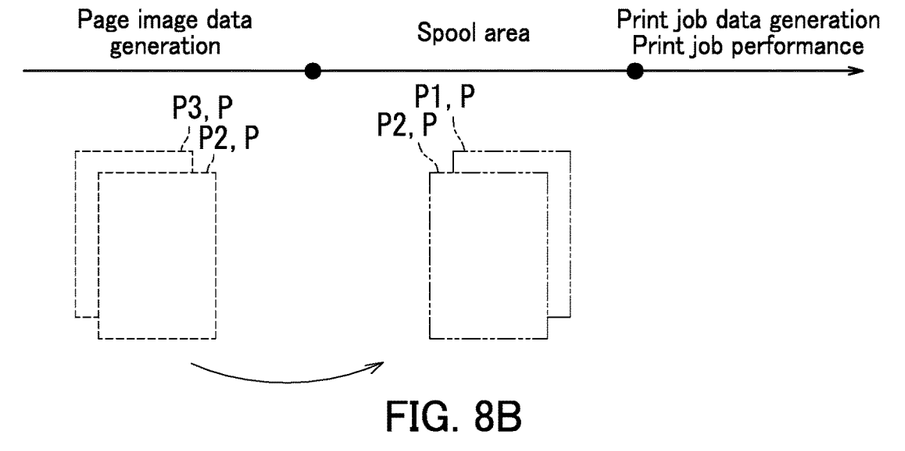
FIG. 8B is a diagram for describing the second job process according to the first embodiment of the present disclosure.
Figure 8C:
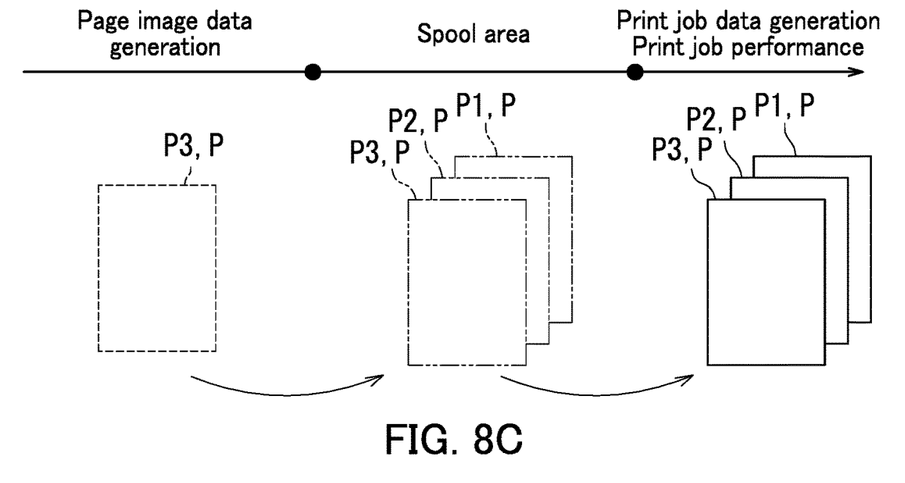
FIG. 8C is a diagram for describing the second job process according to the first embodiment of the present disclosure.

The following further describes the first job process and the second job process according to the first embodiment with reference to FIGS. 7A to 7C and 8A to 8C. FIGS. 7A to 7C are diagrams for describing the first job process according to the first embodiment. FIGS. 8A to 8C are diagrams for describing the second job process according to the first embodiment. In FIGS. 7A to 7C and 8A to 8C, an example is described in which page image data of three pages is generated. In the following, page images P of the three pages are referred to in order starting from the first page as a "first page image P1", a "second page image P2", and a "third page image P3".

The following first describes the first job process according to the first embodiment with reference to FIGS. 7A to 7C. As illustrated in FIG. 7A, upon generating the data indicating the first page image P1, the image processing section 12 transmits data indicating the first page image P1 to the job generating section 14 without storing the data indicating the first page image P1 in the spool area 91. The job generating section 14 generates print job data based on the data indicating the first page image P1 upon receiving the data indicating the first page image P1. The job performing section 15 performs a print job based on the print job data generated by the job generating section 14. As a result, an image corresponding to the first page image P1 is formed on a sheet S.

Next as illustrated in FIG. 7B, upon generating the data indicating the second page image P2, the image processing section 12 transmits data indicating the second page image P2 to the job generating section 14 without storing the data indicating the second page image P2 in the spool area 91. The job generating section 14 generates print job data based on the data indicating the second page image P2 upon receiving the data indicating the second page image P2. The job performing section 15 performs a print job based on the print job data generated by the job generating section 14. As a result, an image corresponding to the second page image P2 is formed on a sheet S.

As illustrated in FIG. 7C, upon generating the data indicating the third page image P3, the image processing section 12 transmits data indicating the third page image P3 to the job generating section 14 without storing the data indicating the third page image P3 in the spool area 91. The job generating section 14 generates print job data based on the data indicating the third page image P3 upon receiving the data indicating the third page image P3. The job performing section 15 performs a print job based on the print job data generated by the job generating section 14. As a result, an image corresponding to the third page image P3 is formed on a sheet S.

When the first method is determined to be the job generation method as described above, the job performing section 15 performs the print job for the number of pages of the page images P included in the output image.

The following describes the second job process according to the first embodiment with reference to FIGS. 8A to 8C. As described in FIG. 8A, the image processing section 12 stores data indicating the first page image P1 in the spool area 91 upon generating the data indicating the first page image P1. Next as described in FIG. 8B, the image processing section 12 stores data indicating the second page image P2 in the spool area 91 upon generating the data indicating the second page image P2. Next as described in FIG. 8C, the image processing section 12 stores data indicating the third page image P3 in the spool area 91 upon generating the data indicating the third page image P3. The controller 10 transmits the data indicating the page images (first page image P1 to third page image P3) of all pages to the job generating section 14 upon determining that the data indicating the page images of all pages has been generated. The job generating section 14 generates print job data based on the data indicating the page images (first page image P1 to third page image P3) of all pages upon receiving the data indicating the page images of all pages. The job performing section 15 performs a print job based on the print job data generated by the job generating section 14. As a result, images corresponding to the page images of all pages are respectively formed on three sheets S. That is, the job performing section 15 forms images corresponding to the page images of all pages on sheets S by performing a print job only once when the second method is determined to be the job generation method.

The first embodiment has been described above. For example, when the first job process is performed in a case in which the volume of input image data is small and the image processing time is not greater than the printing time, or the image processing time is equal to or less than the printing time, the feeding process may not be performed in time and a feeding delay can occur. When a feeding delay occurs, time necessary for the printing process can become greater than a case in which the second job process is performed. When the second job process is performed in a case in which the volume of the input image data is large and the image processing time is greater than the printing time by contrast, a print job is not performed before completion of image processing and the time necessary for the printing process can become greater than a case in which the first job process is performed. According to the present embodiment, the method determining section 13 determines the job generation method to be either the first method or the second method based on the image forming time and the printing time. Accordingly, the time necessary for the printing process can be reduced.

Note that although the present embodiment describes an example in which the user instructs a performance request for the printing process as a job, the user may for example instruct a performance request for a remote printing process as a job. In this case, the image forming apparatus 100 further includes a communication device communicable with an external terminal. A performance request for the remote printing process is instructed from the external terminal through the communication device. The communication device included in the image forming apparatus 100 is an example of a reception section.

For another example, upon receiving a performance request for the printing process, the method determining section 13 may determine whether or not another printing process is being performed. In the following, the printing process being performed (printing process requested to be performed precedently) is referred to as a "first printing process" and a printing process requested to be performed subsequently is referred to as a "second printing process".

The method determining section 13 determines whether or not the first printing process is being performed based on whether or not the job management section 16 is managing a print job. The method determining section 13 determines the job generation method of the print job data generated based on a performance request for the second printing process to be the same job generation method as the job generation method of the print job data generated based on a performance request for the first printing process upon determining that the first printing process is being performed. Therefore, the calculation process of the image processing time by the processing time calculating section 131 and the acquisition process of the printing time by the printing time acquiring section 132 are omitted, for example. Thus, the time necessary for the printing process can be reduced. The method determining section 13 performs the method determination process described with reference to FIG. 4 upon determining that the first printing process is not being performed.

Second Embodiment

Figure 9:
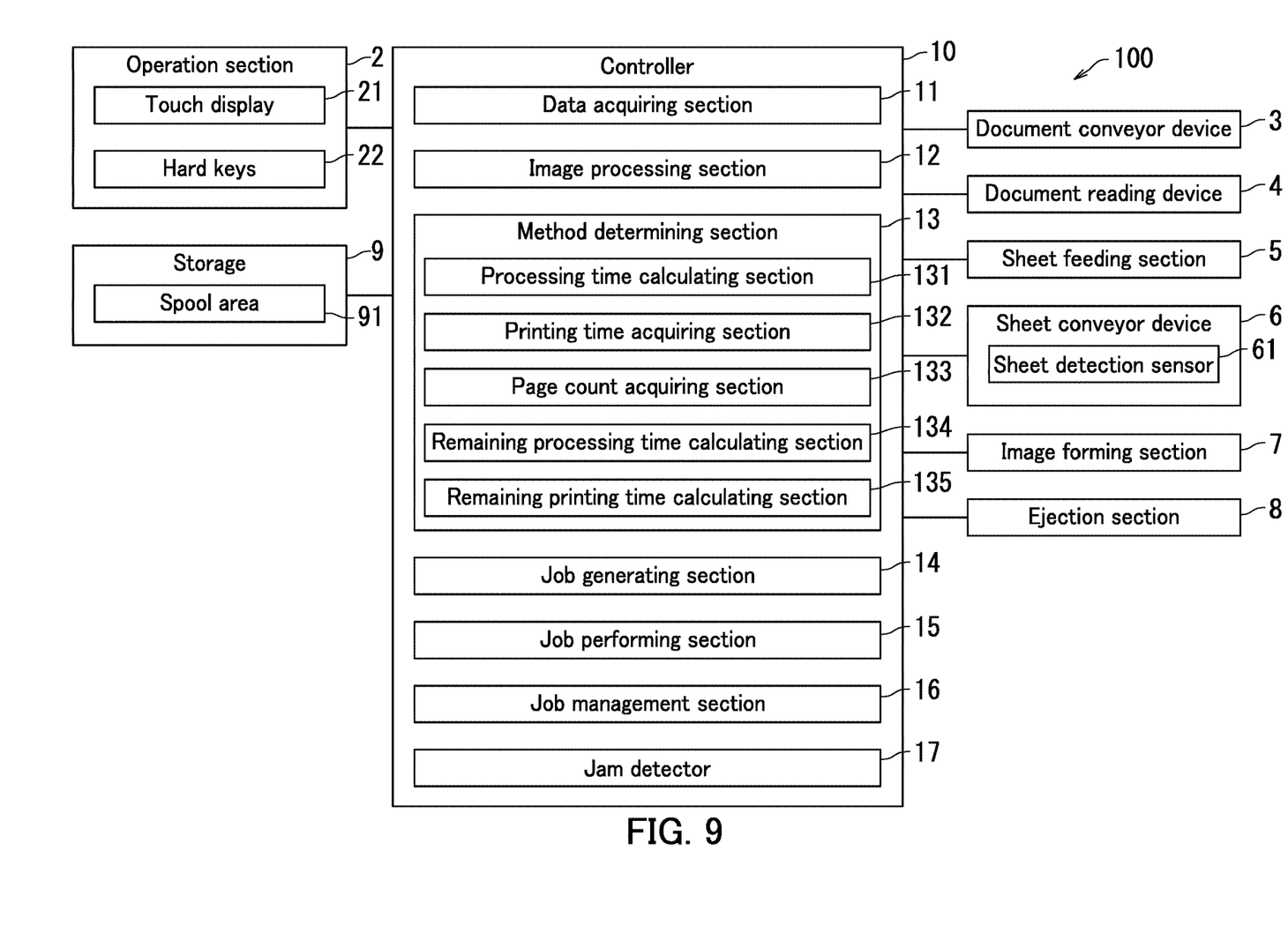
FIG. 9 is a block diagram illustrating a configuration of an image forming apparatus according to a second embodiment of the present disclosure.
Figure 10:
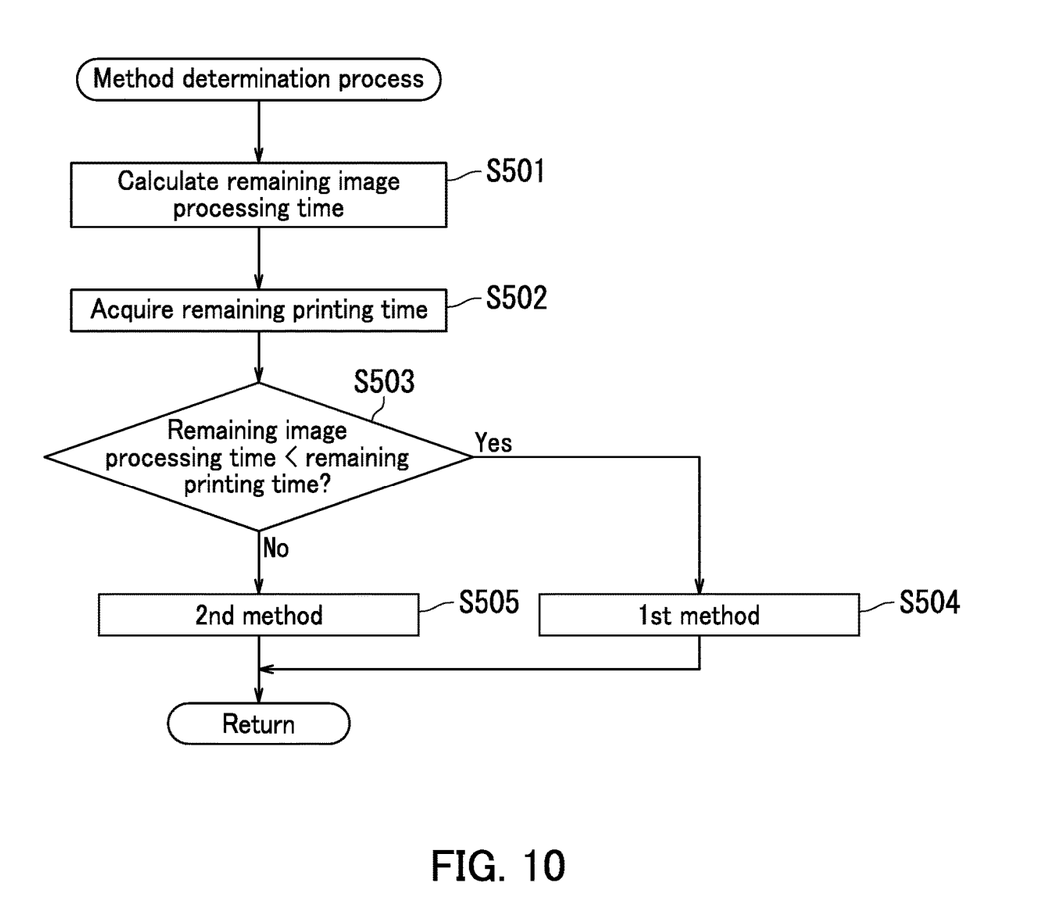
FIG. 10 is a flowchart depicting a method determination process according to the second embodiment of the present disclosure.

The following describes an image forming apparatus 100 according to a second embodiment with reference to FIGS. 9 and 10. The method determination process according to the second embodiment differs from that according to the first embodiment. In the following, items of the second embodiment that differ from the first embodiment are described and description of parts that are common to the first embodiment is omitted.

FIG. 9 is a block diagram illustrating a configuration of the image forming apparatus 100 according to the second embodiment. As illustrated in FIG. 9, the controller 10 functions as a jam detector 17 by executing a program.

The jam detector 17 detects occurrence of a jam. The jam detector 17 also detects clearance of a jam. The jam detector 17 detects occurrence and clearance of a jam based on for example a signal sent from a sheet detection sensor 61 included in the sheet conveyor device 6. The sheet detection sensor 61 is a thru-beam sensor or a reflective sensor, for example.

The method determining section 13 further includes a remaining processing time calculating section 134 and a remaining printing time calculating section 135.

The remaining processing time calculating section 134 calculates remaining image processing time. The remaining image processing time is time necessary for image processing on a part of input image data for which image processing is incomplete in image processing based on the printing process being performed. The remaining processing time calculating section 134 calculates the remaining image processing time based on for example data size of the part of the input data. In detail, the remaining processing time calculating section 134 calculates the remaining image processing time based on the data size of a part of the input image data and data size of a part of the page image data for which image processing has been completed. In further detail, the remaining processing time calculating section 134 for example calculates a proportion of input image data for which image processing has been completed in the image processing based on the printing process being performed. The remaining processing time calculating section 134 calculates the remaining image processing time based on the proportion of the input image data for which image processing has been completed and the time necessary for image processing to be completed on the input image data. Alternatively, the remaining processing time calculating section 134 calculates the remaining image processing time based on the time necessary to generate the page image data per page.

The remaining printing time calculating section 135 calculates remaining printing time. The remaining printing time is time necessary to perform the print job based on the part of the page image data for which the print job is incomplete in the print job based on the printing process being performed. In detail, the remaining printing time calculating section 135 acquires an incomplete page count of page images for which the print job is incomplete in the print job based on the printing process being performed. Upon acquiring the incomplete page count, the remaining printing time calculating section 135 calculates the remaining printing time based on the incomplete page count and data indicating the printing time (time necessary to perform the print job on one sheet S).

FIG. 10 is a flowchart depicting the method determination process according to the second embodiment. The method determination process is started when the jam detector 17 detects that a jam has been cleared after interruption of the printing process due to detection of occurrence of a jam.

As depicted in FIG. 10, the remaining processing time calculating section 134 calculates the remaining image processing time (Step S501). Next, the remaining printing time calculating section 135 calculates the remaining printing time (Step S502), and the method determining section 13 determines whether or not the remaining image processing time is less than the remaining printing time (Step S503). Upon determining that the remaining image processing time is less than the remaining printing time (Step S503: Yes), the method determining section 13 determines the job generation method to be the first method (Step S504) and the method determination process ends. Upon determining that the remaining image processing time is not less than the remaining printing time by contrast (Step S503: No), the method determining section 13 determines the job generation method to be the second method (Step S505) and the method determination process ends. Note that the order of the method determination process is not limited to the above order. For example, Steps S501 to S502 may be replaced with each other.

The job generating section 14 generates the print job data through the job generation method determined by the method determining section 13.

The second embodiment has been described above. According to the present embodiment, the method determining section 13 determines the job generation method to be either the first method or the second method based on the remaining image forming time and the remaining printing time when a jam has been cleared. Accordingly, the time necessary for the printing process can be reduced.

The embodiments of the present disclosure have been described so far with reference to the drawings (FIGS. 1 to 10). However, the present disclosure is not limited by the above embodiments, and may be implemented in various manners within a scope not departing from the gist thereof. Furthermore, the configuration and values indicated in the above embodiments are merely examples and not particular limitations. Various alterations are possible within a scope not substantially departing from the effects of the present disclosure.

For example, the embodiments of the present disclosure describe a case in which the present disclosure is applied to an electrographic image forming apparatus. However, the present disclosure may also be applied to an inkjet image forming apparatus, for example.

What is claimed is:

1. An image forming apparatus comprising:
a controller configured to acquire input image data; and
an image forming section configured to form an image on a sheet based on the input image data, wherein
the controller:
generates output image data by performing image processing on the input image data;
generates print job data based on the output image data;
performs a print job based on the print job data; and
determines a job generation method to be either a first method or a second method, the job generation method being a method through which the print job data is generated,
an output image indicated by the output image data includes page images of one or more pages, each page image being an image to be formed on one sheet,
the first method is a method through which the print job data is generated based on page image data indicating a page image of one page among the one or more pages upon completing the image processing on the page image of the one page,
the second method is a method through which the print job data is generated based on page image data of all pages included in the output image after completing the image processing on page images of all the pages included in the output image,
the controller determines the job generation method based on image processing time necessary for the image processing, printing time necessary to perform the print job, and a page count of the page images included in the output image,
the image processing time is time necessary for the image processing on a page image of a first page among the page images of the one or more pages,
the printing time is time necessary to perform the print job corresponding to the page image of the one page,
in determining the job generation method, the controller
determines whether or not the page count is equal to or less than a page threshold, and
determines, upon determining that the page count is greater than a page threshold, whether or not the image processing time is less than the printing time,
upon determining that the image processing time is not less than the printing time, the controller determines the job generation method to be the second method, and
upon determining that the page count is equal to or less than the page threshold or the image processing time is less than the printing time, the controller determines the job generation method to be the first method.

2. The image forming apparatus according to claim 1, further comprising
a reception section configured to receive a performance request for a printing process, wherein
the printing process includes a first printing process and a second printing process, the second printing process being requested to be performed after the first printing process, and
the controller:
determines, when the reception section receives a performance request for the second printing process, whether or not the first printing process is being performed; and
determines, upon determining that the first printing process is being performed, the job generation method of the print job data generated based on the performance request for the second printing process to be a same job generation method as the job generation method of the print job data generated based on the performance request for the first printing process.

3. The image forming apparatus according to claim 1, further comprising
   a reception section configured to receive a performance request for a printing process, wherein
   the controller determines the job generation method based on remaining image processing time and remaining printing time when the printing process is restarted after being interrupted,
   the printing process includes the image processing and the print job,
   the remaining image processing time is time necessary for the image processing on a part of the input image data for which the image processing is incomplete, and
   the remaining printing time is time necessary to perform a part of the print job based on the page image data which is incomplete.

\* \* \* \* \*